(12) United States Patent
Finlay et al.

(10) Patent No.: US 10,649,991 B2
(45) Date of Patent: *May 12, 2020

(54) PRUNING OF COLUMNS IN SYNOPSIS TABLES

(71) Applicant: International Business Machines Corporation, Armonk, NY (US)

(72) Inventors: Ian R. Finlay, Uxbridge (CA); Christian M. Garcia-Arellano, Richmond Hill (CA); Adam J. Storm, Toronto (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 669 days.

This patent is subject to a terminal disclaimer.

(21) Appl. No.: 15/138,637

(22) Filed: Apr. 26, 2016

(65) Prior Publication Data
US 2017/0308572 A1   Oct. 26, 2017

(51) Int. Cl.
*G06F 7/00* (2006.01)
*G06F 17/30* (2006.01)
*G06F 16/2453* (2019.01)

(52) U.S. Cl.
CPC ............... *G06F 16/2453* (2019.01)

(58) Field of Classification Search
CPC ......... G06F 17/30315; G06F 17/30339; G06F 17/30371; G06F 17/30442; G06F 16/2453
See application file for complete search history.

(56) References Cited

U.S. PATENT DOCUMENTS

| | | | |
|---|---|---|---|
| 5,995,957 A * | 11/1999 | Beavin | G06F 16/24545 |
| 7,302,422 B2 * | 11/2007 | Bossman | G06F 16/217 |
| 7,461,050 B2 * | 12/2008 | Corvinelli | G06F 16/2462 |
| 7,542,975 B2 * | 6/2009 | Rjaibi | G06F 16/284 |
| 7,921,088 B1 | 4/2011 | Mittal | |
| 8,332,367 B2 | 12/2012 | Bhattacherjee et al. | |
| 8,386,444 B2 | 2/2013 | Kraus et al. | |
| 8,423,275 B1 | 4/2013 | Kandal | |
| 8,549,004 B2 | 10/2013 | Lakshminarayan et al. | |
| 8,601,016 B2 * | 12/2013 | Briggs | G06F 16/242 707/760 |

(Continued)

FOREIGN PATENT DOCUMENTS

WO   2013152678 A1   10/2013

OTHER PUBLICATIONS

Adali, et al., "Query Caching and Optimization in Distributed Mediator Systems", SIGMOD '96 Proceedings of the 1996 ACM SIGMOD International Conference on Management of Data pp. 137-146, <http://ilpubs.stanford.edu:8090/86/2/1995-1.pdf>.

(Continued)

*Primary Examiner* — Hasanul Mobin
(74) *Attorney, Agent, or Firm* — Edward J. Wixted, III (57) ABSTRACT

Embodiments of the present invention provide systems and methods for data management. Synopsis tables have been found to be more effective for maintaining a high level of system performance while answering analytical queries. Synopsis tables, which contain MAX, MIN, and Bloom filter columns, may be modified by dropping ineffective data content within these columns and regenerating dropped data when beneficial. By automatically modifying data, database queries may be optimized.

12 Claims, 5 Drawing Sheets

(56) References Cited

U.S. PATENT DOCUMENTS

| | | | |
|---|---|---|---|
| 8,650,179 B2* | 2/2014 | Driesch, Jr. | G06F 16/24545 707/713 |
| 9,569,490 B1* | 2/2017 | Kalarikal Janardhana | G06F 17/30454 |
| 2001/0047360 A1 | 11/2001 | Huras et al. | |
| 2004/0220908 A1 | 11/2004 | Finlay et al. | |
| 2005/0283458 A1* | 12/2005 | Galindo-Legaria | G06F 17/30312 |
| 2006/0068889 A1 | 3/2006 | Okada et al. | |
| 2006/0106777 A1 | 5/2006 | Faunce et al. | |
| 2008/0059412 A1 | 3/2008 | Tarin | |
| 2008/0071818 A1 | 3/2008 | Apanowicz et al. | |
| 2008/0120275 A1 | 5/2008 | Cruanes et al. | |
| 2008/0256575 A1* | 10/2008 | Raju | H04L 12/4625 725/39 |
| 2008/0300965 A1* | 12/2008 | Doe | G06Q 30/0204 705/7.33 |
| 2009/0018992 A1* | 1/2009 | Zuzarte | G06F 16/24524 |
| 2009/0031044 A1 | 1/2009 | Barrack et al. | |
| 2009/0037500 A1 | 2/2009 | Kirshenbaum | |
| 2009/0100004 A1* | 4/2009 | Andrei | G06F 16/2453 |
| 2009/0327252 A1* | 12/2009 | Zhang | G06F 17/30463 |
| 2010/0011031 A1* | 1/2010 | Huang | G06F 21/552 707/E17.007 |
| 2010/0082648 A1 | 4/2010 | Potapov et al. | |
| 2010/0191884 A1 | 7/2010 | Holenstein et al. | |
| 2010/0257181 A1 | 10/2010 | Zhou et al. | |
| 2011/0029569 A1* | 2/2011 | Ganesh | G06F 16/284 707/796 |
| 2011/0113048 A1 | 5/2011 | Njemanze | |
| 2011/0153861 A1 | 6/2011 | Chauhan | |
| 2011/0208703 A1* | 8/2011 | Fisher | G06F 17/3092 707/692 |
| 2011/0258225 A1 | 10/2011 | Taylor et al. | |
| 2012/0036165 A1* | 2/2012 | Driesen | G06F 17/30286 707/803 |
| 2012/0197866 A1 | 8/2012 | Xu | |
| 2012/0303627 A1 | 11/2012 | Keeton et al. | |
| 2013/0132408 A1 | 5/2013 | Little | |
| 2014/0095520 A1* | 4/2014 | Ziauddin | G06F 17/30492 707/756 |
| 2014/0250355 A1* | 9/2014 | Jimison | G06F 3/0483 715/202 |
| 2015/0032763 A1 | 1/2015 | Marwah et al. | |
| 2015/0095299 A1 | 4/2015 | Dickie et al. | |
| 2015/0095379 A1 | 4/2015 | Dickie et al. | |
| 2016/0110417 A1* | 4/2016 | Lakshminarayan | G06F 17/18 707/718 |
| 2016/0179858 A1 | 6/2016 | Finlay et al. | |
| 2016/0179896 A1 | 6/2016 | Finlay et al. | |
| 2016/0188623 A1 | 6/2016 | Finlay et al. | |
| 2016/0246852 A1 | 8/2016 | Pope et al. | |
| 2017/0046367 A1* | 2/2017 | Chang | G06F 17/30303 |
| 2017/0293642 A1 | 10/2017 | Finlay et al. | |
| 2017/0293649 A1 | 10/2017 | Finlay et al. | |
| 2018/0107710 A1 | 4/2018 | Finlay et al. | |
| 2019/0303358 A1 | 10/2019 | Finlay et al. | |

OTHER PUBLICATIONS

Chang, et al., "Bigtable: A Distributed Storage System for Structured Data", Google, Inc., To appear in OSDI 2006, pp. 1-14, <http://static.googleusercontent.com/media/research.google.com/en//archive/bigtable-osdi06.pdf>.

Jagadish, et al., "ItCompress: An Iterative Semantic Compression Algorithm", Data Engineering, 2004, Proceedings 20th International Conference, IEEE, pp. 1-12, <http://www.comp.nus.edu.sg/~ooibc/itcompress.pdf>.

Raman, et al., "DB2 with BLU Acceleration: So Much More than Just a Column Store", Proceedings of the VLDB Endowment, vol. 6, No. 11, Aug. 26-30, 2013, 12 pages, Copyright 2013 VLDB Endowment.

"Bloom Filters—Hypertable—A high performance, scalable, distributed storage and processing system for structured and unstructured data", Google Inc., Updated Feb. 4, 2010, 2 pages, <http://code.google.com/hypertable/wiki/BloomFilters>.

"Bloom Filter", From Wikipedia, the free encyclopedia, Updated Dec. 3, 2013, 12 pages, <http://en.wikipedia.org/w/index.php?title=Bloom_filter&oldid=584413989>.

U.S. Appl. No. 14/575,425, filed Dec. 18, 2014; Entitled "Optimization of Metadata via Lossy Compression".

U.S. Appl. No. 14/737,715, filed Jun. 12, 2015; Entitled "Optimization of Metadata via Lossy Compression".

List of IBM Patents or Patent Applications Treated as Related; Dated Apr. 26, 2016; 2 pages.

U.S. Appl. No. 14/947,506, filed Nov. 20, 2015; Entitled "Scan Optimization Using Bloom Filter Synopsis".

CA Application No. 2876466; Filed Dec. 29, 2014; Entitled "Scan Optimization Using Bloom Filter Synopsis".

U.S. Appl. No. 15/094,213, filed Apr. 8, 2016; "Automatically Revising Synopsis Table Structure".

Appendix P, List of IBM Patents or Patent Applications Treated as Related, 2 pages, dated Jan. 8, 2018.

Finlay et al., "Pruning of Columns in Synopsis Tables", U.S. Appl. No. 15/845,246, filed Dec. 18, 2017, 33 pages.

\* cited by examiner

| COLUMN | C1 | C2 | C3 |
|---|---|---|---|
| PRED_TYPE | 00000001 | 00000110 | 00011111 |
| COUNT | 100 | 10000 | 500 |
| AVG_SELECTIVITIY | 0.001 | 0.1 | 0.5 |
| MEASURE = COUNT/AVG_SELECTIVITY | 100000 | 100000 | 1000 |

PRUNING OF COLUMNS IN SYNOPSIS TABLES

BACKGROUND OF THE INVENTION

The present invention relates generally to the field of data management and more specifically to metadata storage optimization.

Data warehouse systems (i.e., systems used for reporting and data analysis with central repositories of integrated data from one or more disparate sources) have massive tables that often require large amounts of data to be read from them in order to answer analytical queries. Predicates used in queries within the workload can be specified on various different columns. Traditional B-Tree indexes or bit map indexes can improve the performance of the queries but defining these indexes is often not a solution as there are significant administration costs, maintenance overhead, and storage overhead associated with these objects. Auxiliary metadata in the form of synopsis tables has been found to be more effective for performance but they can require significant storage.

SUMMARY

According to one embodiment of the present invention, a method for data management is provided with the method comprising the steps of: organizing, by one or more processors, a plurality of data content in one or more data tables; monitoring, by one or more processors, a usage of the plurality of data content in the one or more data tables using an in-memory structure; and modifying, by one or more processors, the plurality of data content in the one or more data tables, based on a selectivity threshold which defines an effectiveness for optimizing data queries.

Another embodiment of the present invention provides a computer program product for data management, based on the method described above.

Another embodiment of the present invention provides a computer system for data management, based on the method described above.

DETAILED DESCRIPTION

Embodiments of the present invention provide systems and methods to monitor metadata usage for optimizing database queries and to automatically optimize the storage of this metadata by pruning ineffective metadata information and, if necessary, regenerating dropped metadata when beneficial.

Traditional B-Tree indexes or bit map indexes are used to answer analytical queries. These indexes often incur significant administration cost, maintenance overhead and storage overhead associated with these objects. Preferred embodiments of the present invention describe methods and systems which implement the use of metadata tables for example, synopsis tables used in database technology or a persistent data table used in an analytic application. These metadata tables are henceforth called synopsis tables. Synopsis tables address issues with administration costs and maintenance overhead associated with traditional indexes.

Synopsis tables are auxiliary summary tables that provide the MIN and MAX values of columns of the main table that are aggregated over a block of rows in a database. A similar structure is used in analytical applications in the form of "zone maps" (which are persistent data tables), which are kept at the level of a page or block of pages. The synopsis tables comprise at least of the columns of the main table. For purposes of this disclosure, the terms "synopsis" and "zone maps" may be considered as synonyms unless an explicit difference is called out. Synopsis tables may also store a bloom filter column referred to as BLOOM. A bloom filter is a set of binary bits (i.e., "0" and "1"). These bits are set by applying a hash function to all the base table column values in a block. The result of the hash function is used to index the bloom filter and set the corresponding bit to 1. For example, a synopsis BLOOM column value may be "1100101110001101" after a bit is set for each of the corresponding base table column values in a corresponding block in the base table. The synopsis table is dynamically and efficiently maintained when rows are inserted or deleted in the main table. When a table is created a synopsis table is automatically created. All eligible columns in the main table have corresponding MIN and MAX columns in the synopsis table. Queries specifying predicates can thus try to exploit the synopsis metadata for performance. When a predicate (i.e., the syntax used to specify a subset of rows to be returned are specified in the "Where" clause of a SQL statement) on a column of the main table is used in a query such as "c1>=5", the database system can skip reading blocks where the MAX value in the synopsis table is less than 5. This can increase computational efficiency, especially when the data is clustered to limit the overlapping of MIN and MAX values. Similarly with the predicate of "C1=5", the application of the same hash functions to "5" results in block "0000000000100000" (i.e., the $11^{th}$ bit is set to 1). If the BLOOM value in the synopsis table corresponding to a block of data in the base table is "1100101110001101", the database system knows that the value "5" does not exist in the block because if it did, the BLOOM column value for the block would have a "1" in the 11th position in the bloom filter. Even if the data is not well clustered, the bloom filter can be exploited to more effectively handle various forms of predicates including EQUALITY, IN, and OR predicates.

Synopsis tables are not effective if too many rows in the main data table are represented by a single row in the synopsis table. The MIN and MAX values in each row of the synopsis table start to cover the entire range of values in the column in the main data table if the data is not clustered. Similarly, as more values are represented in the bloom filter, most of the bits are set to 1 and then the bloom filter is ineffective for skipping blocks of data in the base table.

Thus, the synopsis table may not be effective in reducing the amount of data read from the main table.

Conversely, fewer rows in the main data table represented by a single row in the synopsis table effectively allow the database system to eliminate reading blocks of rows or pages from the main data table. However, the synopsis table itself (which can occupy a significant amount of space and processing to read and use the synopsis table itself) increases as the number of rows in the synopsis table gets closer to the number of rows in the main data table. In addition, with every column in the main data table represented by potentially 3 columns in the synopsis table (i.e., the MIN, MAX, and BLOOM columns), the synopsis table can occupy significant storage space if there are not enough main data table rows for a given synopsis table row.

Synopsis tables need to be of a reasonable size to be effective for search queries. The storage occupied by the synopsis table may be relatively large yet still be effective for search queries. For example, in certain database systems, an ideal synopsis is found to be around a thousandth of the size of the main data table in terms of the number of rows. Depending on the insertion or deletion patterns, the synopsis table can be larger. The MIN/MAX values in the synopsis tables are effective when the data is clustered.

A table in a database system may have a large number of columns but only a few of the columns are referenced in filtering predicates. Thus, many of the columns in the synopsis table may be unused or rarely used to improve query performance and simply occupy storage space. For example, a synopsis table may have 25 columns, where only 5 columns are used very frequently in predicates, another 5 columns are used occasionally in predicates, and yet another 5 columns are used very rarely in predicates. The idea presented in this invention is for the database system to automatically monitor, weigh the benefit of keeping synopsis table columns in order to optimize the amount of storage required for the synopsis table without adversely affecting performance of queries. If necessary, with a changing query workload, synopsis table columns can also be recreated.

Figure 1:
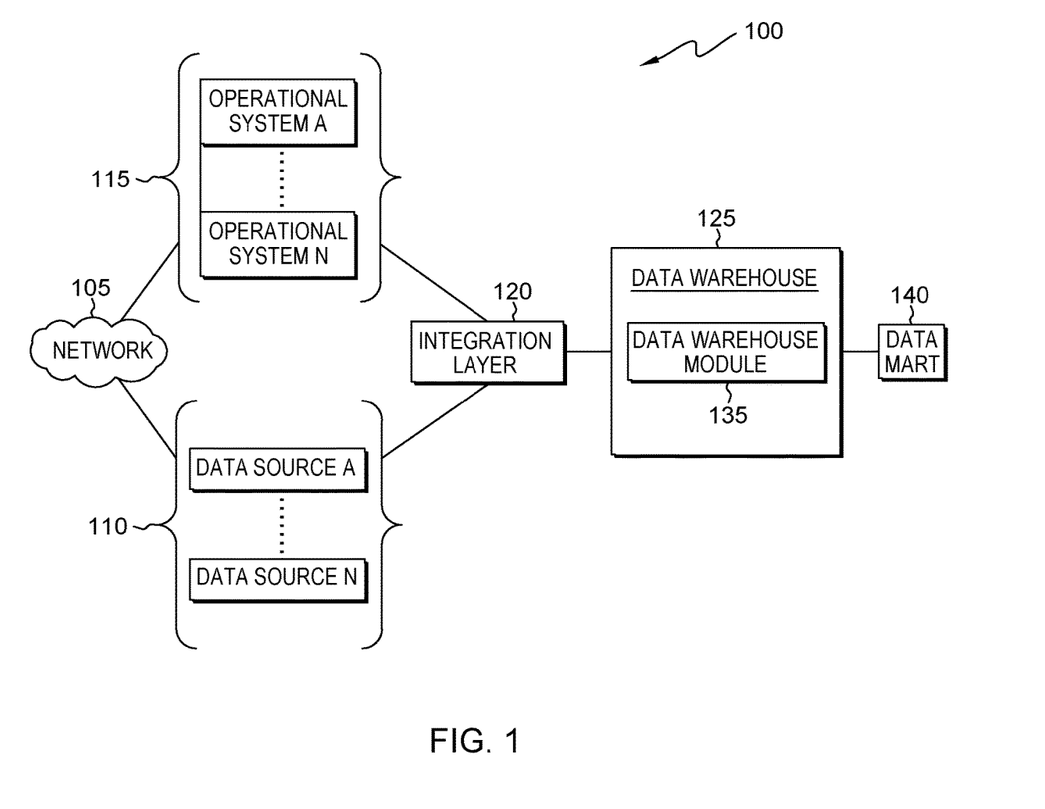
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes: operational systems 115A-N and data sources 110A-N connected by network 105; integration layer 120; data warehouse 125; and data mart 140.

Operational systems 115A-N refer to a computing device (or system) used to process the day-to-day transactions of an organization. Operational systems A-N are designed in a manner that processing of the day-to-day transactions is performed efficiently and the integrity of the transactional data is preserved. In some embodiments, operational systems 115A-N can be operational databases systems (i.e., the management of dynamic data in real-time and the allowance of users to modify data in real-time), online transaction processing systems (i.e., the facilitation and management of transaction-oriented applications which typically responds immediately to user requests), or batch processing systems (i.e., the execution of a series of programs or jobs on a computing device without manual intervention). Transactions can be a computer/database transaction where a unit of work is performed within a database management system against a database and treated in a coherent way independent of other transactions. Transactions can also be defined in terms of business or commercial transactions. The computing devices of operational systems 115A-N which facilitate the processing of transactions may be a laptop computer, a tablet computer, a netbook computer, a personal computer (PC), a desktop computer, a personal digital assistant (PDA), a smart phone, a thin client, or any programmable electronic device capable of communicating through integration layer 120, data warehouse 125, and data mart 140. The computing devices of operational systems 115A-N may include internal and external hardware components, as depicted and described in further detail with respect to FIG. 5.

Data sources 110A-N are external sources of data which can be fed into integration layer 120 for further processing. In other embodiments, data sources A-N 110 can be fed into operational systems 115A-N for processing.

Data mart 140 is the access layer of the data warehouse environment that is used to get data out to the users. Through a user interface, such as a graphical user interface (GUI) or a web user interface (WUI), text, documents, web browser windows, user options, application interfaces, instructions for operation, and other information (such as graphics, text, and sound) are presented to the user. For example, control sequences may be employed by the user to control a program. Data mart 140 is a subset of the data warehouse that is often oriented to a specific business line or team. Data mart 140 is a collection of small slices of data warehouse 125. Whereas data warehouse 125 has an enterprise-wide depth, the information in data mart 140 pertains to a single department within an enterprise. In some deployments, each department or business unit is considered the owner of its data mart including all of the associated hardware, software, and data. This enables each department to use, manipulate, and develop their data any way the owner sees fit (without altering information inside other data marts or the data warehouse). In other deployments where conformed dimensions are used, this business unit ownership does not hold true for shared dimensions (e.g., customers, products, etc.).

Network 105 can be, for example, a local area network (LAN), a wide area network (WAN) such as the Internet, or a combination of the two, and can include wired, wireless, or fiber optic connections. In general, network 105 can be any combination of connections and protocols that will support communication between operational systems 115A-N and data sources 110A-N.

Integration layer 120 receives data from operational systems 115A-N and data sources 110A-N via extract-transform-load (ETL) processes known in the art. Further processes performed by integration layer 120 are: staging, data integration, and access layers to house key functions. The staging layer or staging database resides in a location separating each of the disparate data system sources (i.e., operational systems 115A-N and data sources 110A-N) and stores the raw data extracted from each of the disparate data system sources. Integration layer 120 integrates the disparate data system sources by transforming the data from the staging layer and storing this transformed data in an operational data store (ODS) database within integration layer 120. The access layer facilitates the retrieval of data by data warehouse 125.

Data warehouse 125 receives the integrated data from integration layer 120, where the data is arranged into hierarchical groups often called dimensions and into facts and aggregated facts. The combination of facts and dimensions is sometimes called a star schema. Data warehouse 125 focuses on data storage. The main source of the data is cleaned, transformed, cataloged, and made available for use by managers and other business professionals for data mining, online analytical processing, market research, decision support, or some other functionality. Essential components of data warehouse 125 include modules to retrieve and analyze data; to extract data; to transform and load data; and to manage the data dictionary. An expanded definition for data warehouse 125 can include business intelligence tools; tools to extract, transform, and load data into the repository; and tools to manage and retrieve metadata. Data warehouse 125 aims to eliminate data redundancy and provides a single source of information from which data mart 140 reads and provides a wide range of business information. Data warehouse 125 is an online analytical processing (OLAP) database structure where the data is organized specifically to facilitate the reporting and analysis of data or resultant data, but typically not for quick-hitting transactional needs.

Data warehouse module 135 has the following functionalities and/or characteristics: (i) scanning a table referred to as the main table works in conjunction with a synopsis table containing MIN values, MAX values, and bloom filters in rows for all values in a block of rows; (ii) permitting predicates to be applied first to the synopsis tables in order for a database to skip over blocks of the main table during the scan of the main table; (iii) monitoring a synopsis table and predicate types; (iv) monitoring columns on which predicates are applied; (v) computing average selectivity (which is a measure of synopsis table effectiveness); (vi) automatically optimizing the storage of synopsis tables; (vii) dropping ineffective columns within a synopsis table; and (viii) adding the dropped column back into the synopsis table in a similar fashion as a newly added column to the base table does, and doing this only if predicates start to be used on the corresponding main table column.

Figure 2A:
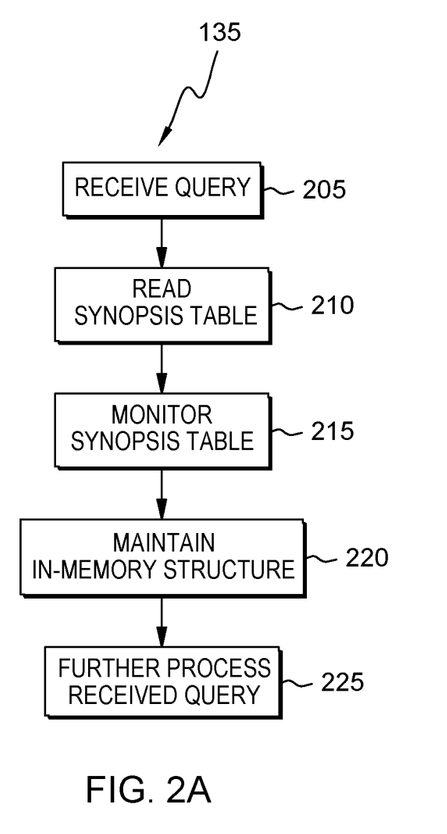
FIG. 2A is a flowchart depicting the operational steps of a data warehouse program upon receiving a query, in accordance with an embodiment of the present invention.

FIG. 2A is a flowchart depicting the operational steps of data warehouse module 135 upon receiving a query, in accordance with an embodiment of the present invention.

In step 205, data warehouse module 135 receives a query against a main data table. These tables may be very large and a quick response is often critical even though a large portion of the table may need to be read. In order to skip data blocks, a synopsis or meta table is associated with the main table.

In step 210, data warehouse module 135 reads the synopsis table. More specifically, the query is applied on predicates to the corresponding MIN, MAX, or BLOOM columns of the synopsis table associated with the predicate column in the main table in the query.

In step 215, data warehouse module 135 monitors the synopsis table usage. Based on the number of blocks that need to be read (BR) versus the number of blocks that can be skipped (BS), the effectiveness or selectivity (SEL) of the synopsis is determined as:

$$SEL=((BR-BS)/BR)*100. \quad (eq. 1)$$

The monitoring of a synopsis table leads to determinations in order to find: (i) the number of times predicates are applied; (ii) the types of predicates which are applied; (iii) the average percentage of blocks of data which are skipped in the main table over queries; and (iv) the number of updates, deletes, or inserts on each region of the main table associated with the rows of the synopsis table.

In step 220, data warehouse module 135 maintains a set of in-memory with a data structure defined as (COUNT, PRED_TYPE, AVG_SELECTIVITY) corresponding to each column in the synopsis table to track a count of predicates and a predicate type when the synopsis table is used. The COUNT field is incremented each time a query has a predicate that warrants use of the synopsis table. A PRED_TYPE field tracks predicate types for which the synopsis was used. For example, the predicate is on column C1 and "xxx", "yyy", etc., are constants or columns. If the predicate is an "equality" or an "IN predicate", wherein C1=xxx, C1 IN (xxx, yyy . . . ), then bit "0" is set to "1". If the predicate type is a "greater than" or "greater than or equal to" predicate (i.e., C1>xxx, C1>=xxx), then bit "1" is set to 1. If the predicate type is "less than" or "less than or equal to" (i.e., C1<xxx, C1<=xxx), then bit "3" is set to 1. Counts of these predicate types may also be maintained to account for rarely used predicate types. The AVG_SELECTIVITY field tracks the effectiveness of a predicate on a corresponding synopsis column over multiple queries. Thus, a selectivity measurement is blended into the average, and the average is maintained over a number of queries. AVG_SELECTIVITY is defined as:

$$AVG\_SELECTIVITY=(AVG\_SELECTIVITY* (COUNT-1)+SEL)/COUNT \quad (eq. 2)$$

In step 225, data warehouse module 135 further processes the received query, in order to access and return data to the application or the user.

Figure 2B:
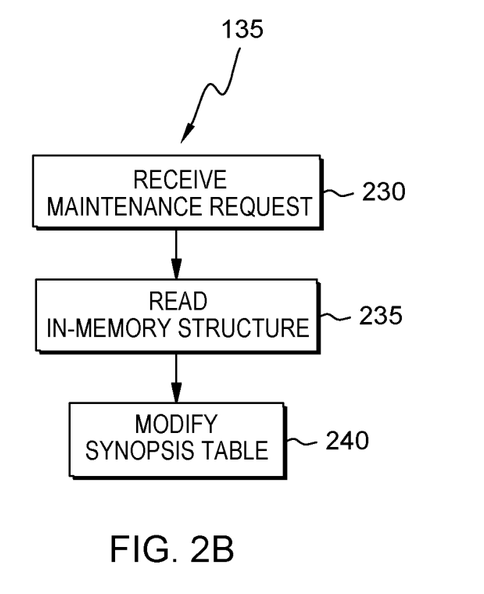
FIG. 2B is a flowchart depicting the operational steps of a data warehouse program upon receiving a maintenance request, in accordance with an embodiment of the present invention.

FIG. 2B is a flowchart depicting the operational steps of data warehouse module 135 upon receiving a maintenance request, in accordance with an embodiment of the present invention.

In step 230, data warehouse module 135 receives a maintenance request. A maintenance request is typically received from a daemon which does automatic table maintenance. The daemon collects statistics on the in-memory structure. The maintenance request can also be sent as a manual command. A table "REORG" command is an example of such a manual command. Once this maintenance request is received, data warehouse module 135 inspects the statistics which accumulated in the in-memory structure.

In step 235, data warehouse module 135 reads the in-memory structure for a synopsis table. Once a maintenance request is received, data warehouse module 135 inspects the statistics which accumulated in the in-memory structure. When some action is taken to maintain the synopsis table, the statistics may be cleared. Thus, there may be modifications by adding a step to reset the numbers in the in-memory structure for synopsis columns which have been modified. If the statistics within the in-memory structure corresponding to the synopsis table indicates that a threshold number of queries have been received with predicates on one or more columns and were effective relative to values for other columns, then the other columns are candidates to be dropped. For example, after a period of query activity on a main table (e.g., 1000 queries on the main table), data warehouse module 135 determines the predicate counts of columns C1, C2, C3, and C4. Columns C1 and C2 in the main table have a predicate count of 600 and 500, respectively, in the in-memory structure. Columns C3 and C4 have a predicate count of 100 and 0, respectively. Due to the lower predicate counts of C3 and C4, synopsis table columns MIN, MAX and BLOOM corresponding to C3 and C4 may be candidates to be dropped. If the AVG_SELECTIVITY for C1 is 0.50, C2 is 0.95, and C3 is 0.0 in conjunction with the counts of the columns, then data warehouse module 135 may drop C2 and C4 using a suitable formula and a threshold in order to combine the effectiveness (eq. 1) and the counts. In this embodiment, a simplified algorithm is considered using averages benefiting the most frequent query predicate patterns for illustration purposes. In other embodiments, a different in-memory structure is maintained by: looking at the highest benefit for the most expensive queries (i.e., the top 10%), looking at the absolute benefit, looking at combinations of predicates, etc. Another value, MEASURE, is based on the AVG_SELECTIVITY and the COUNT of queries that exploited the synopsis in conjunction with a threshold. MEASURE is used to decide whether to maintain the synopsis table or not.

In step 240, data warehouse module 135 modifies a synopsis table. This step aims to automatically optimize the storage and examine the costs of the synopsis tables used to skip over blocks of the main data table, during the scan of the main data table, after monitoring the synopsis table usage and the effectiveness of the synopsis table usage. Modification of a synopsis table is carried out by: (i) dropping MIN, MAX, and bloom filter columns; (ii) dropping MIN, MAX, or bloom filter columns; (iii) dropping the entire synopsis table (i.e., a comprehensive synopsis table); and (iv) regenerating the dropped column(s). Synopsis table columns, which are not effective for optimization after monitoring over a period of activity, are dropped. In some instances, data warehouse module 135 modifies the synopsis table by dropping these ineffective columns by dropping the minimum, maximum, or bloom filter columns in the synopsis table during the absence of predicates on the corresponding main table column over a sufficiently long period of time. This implies that maintaining these dropped columns does not influence optimization. Additionally, data warehouse module 135 drops the minimum, maximum, and bloom filter columns in the synopsis table when there are relatively few instances of predicates on the corresponding main data table column compared to the number of queries on the synopsis table and compared to the usage of other synopsis columns. Data warehouse module 135 may drop either one of: the MIN, MAX, or bloom filter columns in the synopsis tables, which depends on predicate types and the effect of keeping a specific column (to be dropped) in the synopsis table in comparison to having MIN, MAX, and bloom filter columns. When most MIN values are the same as or most MAX values are the same as or most bloom values within a corresponding table, are the same as the synopsis table having MIN, MAX, and bloom filter columns, data warehouse module 135 may drop either the MIN, MAX, or bloom filter column. Data warehouse module 135 may drop the bloom filter column for a column in the synopsis table if the MIN/MAX is as effective for equality predicates with well clustered columns as a synopsis table with MIN, MAX, and bloom filter columns. Data warehouse module 135 may drop the entire synopsis table if a sufficient number of the synopsis table columns have been dropped and the remaining columns do not provide any value to queries over a significant period of time. Data warehouse module 135 may regenerate the dropped MIN, MAX, and/or BLOOM columns based on statistics maintained on the dropped column upon determining there are queries with predicates on dropped columns based upon meeting threshold values. Trigger conditions pertaining to dropping, maintaining, and regenerating columns are described in further detail with respect to FIG. 4.

Figure 3:
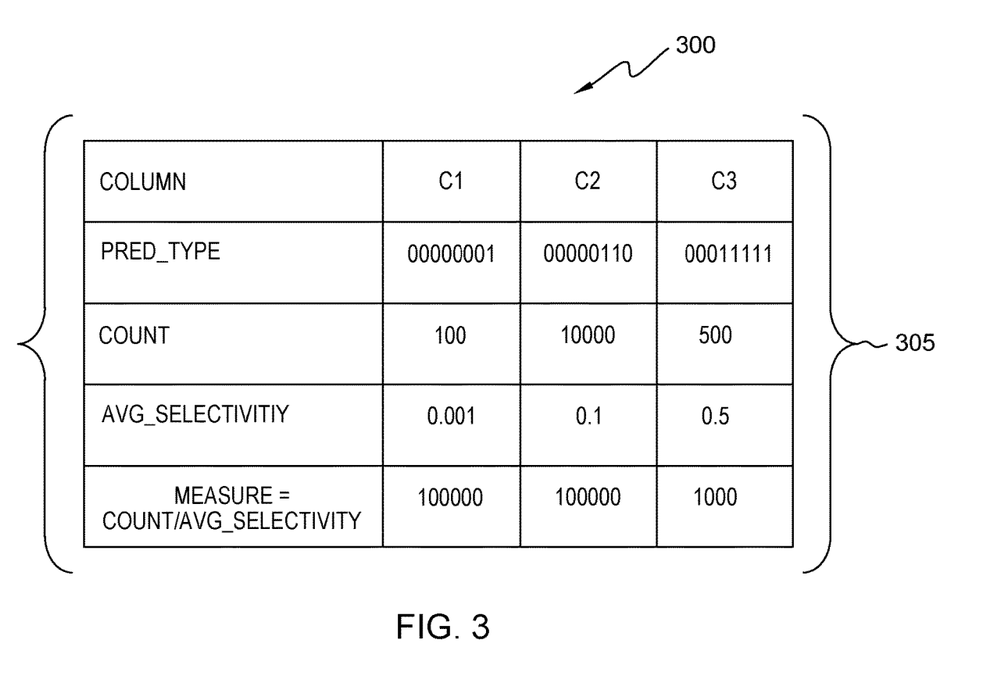
FIG. 3 is an example of an in-memory synopsis monitor structure, in accordance with an embodiment of the present invention.

FIG. 3 is an example of an in-memory structure, in accordance with an embodiment of the present invention.

STRUCT1 is an example of an in-memory structure which is depicted in FIG. 3 as in-memory structure 305. In-memory structure 305, which is used to monitor the three columns in a main table, is described in terms of values for the COUNT, the predicate type, the average selectivity value, and the computed MEASURE.

The following notations are used throughout the disclosure: "=," ">=", "<=", ">", "<". These notations represent the following: "=" means "equal to"; ">=" means "greater than or equal to"; "<=" means "less than or equal to"; ">" means "greater than"; and "<" means "less than".

STRUCT1 is written to a disk periodically (e.g., every hour) without needing to have the most up-to-date information. At a database stop time, this may be flushed to a disk. At database start time, the information is brought into the memory from the disk. Unexpected and atypical failures may lose up to the last hour of updates, but this can be overcome within a period of time (e.g., after weeks if necessary) as the updated information is used to modify the synopsis table automatically.

For the purpose of monitoring the system, the in-memory structure format is: STRUCT1 (COUNT, PRED_TYPE, and AVG_SELECTIVITY) which corresponds to each column in the main table. The in-memory utility in data warehouse module 135 is maintained within the memory in order to assist in keeping track of: (i) the count of predicate and (ii) the predicate types and (iii) the effectiveness of the synopsis table used over time or for a threshold number of queries.

The PRED_TYPE field keeps track of the predicate types, respectively for which the synopsis table is used. The predicate value can be an equality, IN, or range predicate. For example, PRED_TYPE is a set of bit flags that are updated to 1 depending on the predicate type C1 (where the relop is "=," "IN", ">=", "<=", ">", "<", or other programming syntax conventions). BETWEEN predicates set the bits for both ">=" and "<=" notations. OR predicates comprise of all of the decomposed sub terms where each sub term is handled as an independent predicate. Considering bits of an 8 bit flag, the first bit from the right denotes an equality predicate or an IN predicate. The second bit denotes ">" predicate, the third bit a ">=" predicate the fourth denotes "<" and the fifth from the right denotes "<=" predicates. For example, C1 with a value of 1 only has equality predicates, C2 has only ">" and ">=" predicates while C3 has all types of predicates.

The COUNT field in STRUCT1 is updated each time a query has a predicate type that warrants the use of the synopsis table. The numbers 100, 10000, and 500 are the values for COUNT field for the corresponding predicates C1, C2, and C3, respectively. Maintaining a COUNT for each predicate type is ideal, but the in-memory structure can become large so a consolidated number may be used.

The AVG_SELECTIVITY field keeps track of the effectiveness of the synopsis table on the associated column. After testing a predicate against the values in MIN, MAX, or bloom filter columns in the synopsis table, the selectivity of one or more queries are determined by finding the ratio of: the number of synopsis table rows that indicate a need to read the main table blocks to the total number of synopsis table rows. The synopsis table has one row for each block of data in the main table. After applying the predicate on the synopsis table, the data warehouse module 135 determines how many blocks from the main table need to be read compared to how many blocks are considered. For example if there are 200 blocks and 150 of these can be skipped, the selectivity is 50/200=0.25. If the selectivity is 0.35 for the next query, the AVG_SELECTIVITY is 0.30 for the two queries AVG_SELECTIVITY is the average selectivity that is computed over a number of queries that have a predicate on the main table column which uses the synopsis table. The average selectivity for predicate C1, C2, and C3 are 0.001, 0.1, and 0.5, respectively.

When considering the average filtering effect and the number of times the synopsis was exploited, a "MEASURE" is computed by dividing COUNT values over the AVG_SELECTIVITY value. The "MEASURE" is a value computed which is compared to a threshold. Columns having a "MEASURE" value lower than or equal to the threshold are dropped. A lower "MEASURE" value is indicative of lower relative benefit of a predicate (compared to the "MEASURE" for other columns and a suitable threshold) to a query and thus data warehouse module 135 drops predicates deemed as providing lower relative benefit or no benefit to the query. The threshold may be a relative threshold. In this embodiment, the threshold value is a "MEASURE" value of 1000. The "MEASURE" values for C1, C2, and C3 predicates are 100000, 100000, and 1000, respectively. As a result in this embodiment, the synopsis columns corresponding to C1 and C2 are maintained, while the synopsis columns corresponding to C3 is dropped.

Ineffective synopsis table MIN, MAX or bloom columns are dropped if the "COUNT" values for a main table column in STRUCT1 is "0" after a predetermined duration of time or a threshold number of queries is exceeded since the "reorganization" of the synopsis table. If (and since) there are not any predicates applied to this main table column for a considerable length of time, there is little value keeping the synopsis data. MIN, MAX or bloom columns are dropped if the "COUNT" values for a main table column in STRUCT1 is below a threshold value relative to other column "COUNT" values and is below another threshold value for the "MEASURE" value in conjunction with the AVG_SELECTIVITY value.

Figure 4:
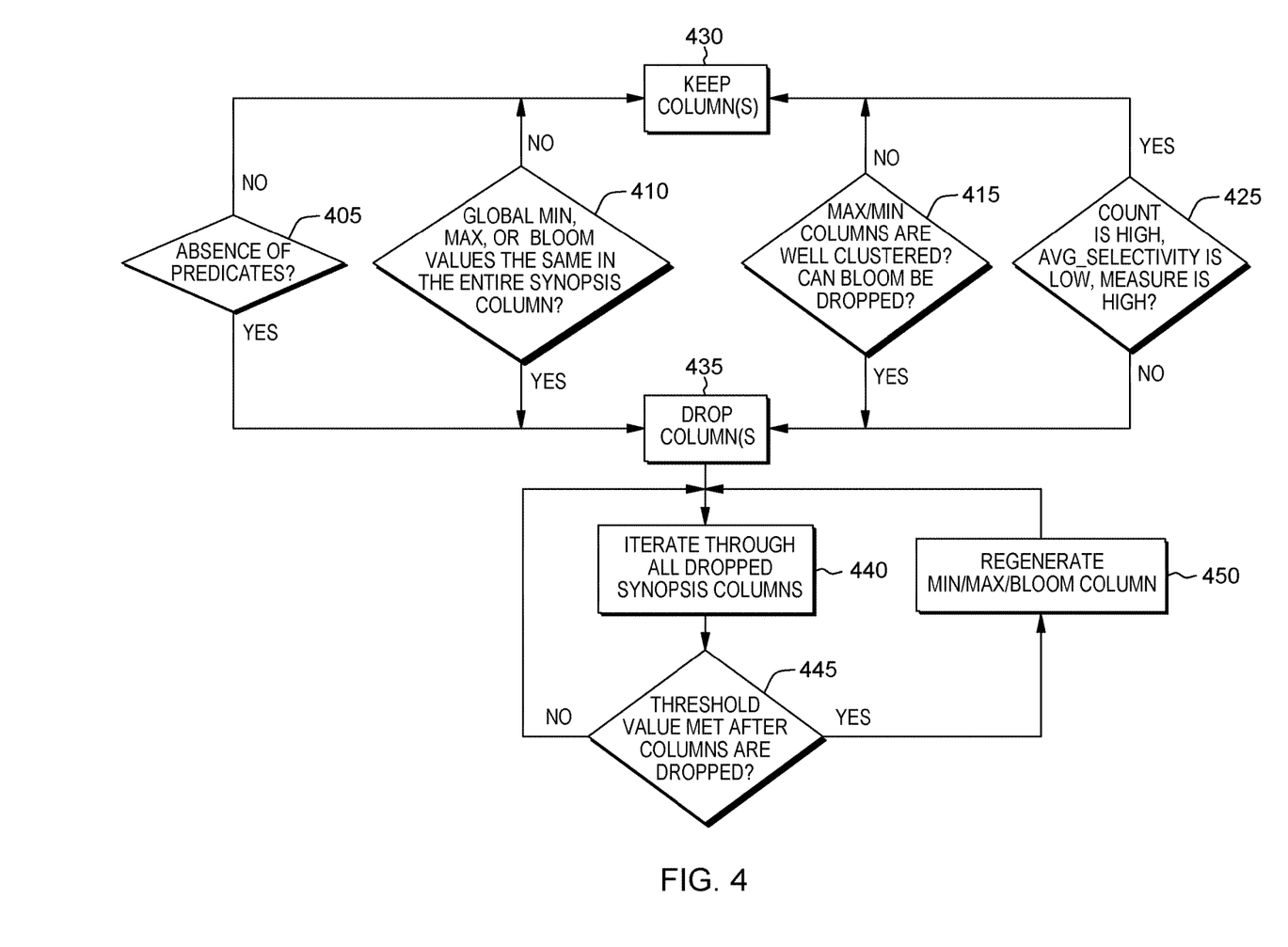
FIG. 4 is a flowchart depicting the operational steps to test predicate types, in accordance with an embodiment of the present invention.

FIG. 4 is a flowchart depicting the operational steps to test predicate types, in accordance with an embodiment of the present invention.

Predicate types (PRED_TYPE) are tested after a period of time of active use of a synopsis table by data warehouse module 135.

For each column in the synopsis table, data warehouse module 135 evaluates the triggers 405, 410, 415, 425. Triggers 405, 410, 415, and 425 may lead to result 430 or result 435. If result 435 is obtained, then data warehouse module 135 performs process 440, which is followed by the evaluation of trigger 445. Trigger 445 may lead to process 450 or process 440.

In trigger 405, data warehouse module 135 determines if there is an absence of a predicate. The absence of a predicate is indicated by a COUNT of 0 and a PRED_TYPE bits for all comparison operators is set to 0 (i.e., the PRED_TYPE has a value of "00000000").

In result 430, data warehouse module 135 keeps columns upon determining there is not an absence of a predicate (i.e., the "No" branch of trigger 405). In other words, data warehouse module 135 does not drop one or more columns when there is not an absence of a predicate.

In result 435, data warehouse module 135 drops column(s) upon determining there is an absence of a predicate (i.e., the "Yes" branch of trigger 405). If the bit corresponding to PRED_TYPE "equality" or "IN predicates" is 0 (first bit from the right) for a particular main table column, the bloom filter column of the corresponding synopsis table column is dropped. If the bit corresponding to PRED_TYPE of greater than or equal to is set to 0 for a particular main table column, then the MIN column of the corresponding synopsis table column is dropped. If the bit corresponding to PRED_TYPE of less than or equal to, or less than, is set to 0 for a particular main table column, then the MAX column in the corresponding synopsis table column is dropped.

In trigger 410, data warehouse module 135 determines if the global MIN, MAX, or bloom values is the same in the entire synopsis column table. This type of determination on the global MIN, MAX, and bloom value may be indicative of providing any data skipping benefit. This is determined if the all the values in the MIN, MAX or BLOOM synopsis column are identical and if COUNT is greater than 0 and AVG_SELECTIVITY equals 1.0 for this synopsis column.

In result 430, data warehouse module 135 may keep column(s) upon determining the global MIN, MAX, or bloom values are not the same in the entire synopsis table provided (i.e., the "NO" branch of trigger 410). Compression is applied to optimize space and once tested on the global values, the rest of the synopsis table does not need to be read.

In result 435, data warehouse module 135 drops column(s) upon determining the global MIN, MAX, or bloom values are the same in the entire synopsis column (i.e., the "YES" branch of trigger 410). Compression is not applied to optimize storage in result 435.

In trigger 415, data warehouse module 135 determines if max/min columns are well clustered and if the BLOOM can be dropped. The indication of data being clustered occurs when the MIN and MAX values are increasing while moving through the synopsis table with some tolerance for equal or minor fluctuations between adjacent rows of the synopsis table. When clustered MIN/MAX columns can be used effectively for equality or IN predicates, then the BLOOM column is not needed.

In result 430, data warehouse module 135 keeps column(s) upon determining that the MAX/MIN columns are not well clustered and the BLOOM column is effective for equality and IN predicates on the corresponding column of the main table (i.e., the "NO" branch of trigger 415).

In result 435, data warehouse module 135 drops the BLOOM column upon determining dropping is as effective for predicates using the well clustered MAX/MIN columns for equality and IN predicates (i.e., the "YES" branch of trigger 415). When the data is well clustered on the corresponding column in the main data table, then an algorithm (for detecting the clustering for a column) is used to drop the BLOOM column.

In trigger 425, data warehouse module 135 determines if: a COUNT is high, AVG_SELECTIVITY is low, and MEASURE is high. At least some of MIN or MAX or bloom (filter) column values may not be the same as that of other values in that column of the synopsis table. For example, trigger 410 makes a determination on a data block, which has two distinct values ("A" and "B") where "A" is the MIN column value and "B" is the MAX column value. In trigger 425, data warehouse module 135 decides on the action to be taken by taking into consideration COUNT, AVG_SELECTIVITY, and the derived value MEASURE. If the AVG_SELECTIVITY is high (value closer to 1) and the MEASURE is low, the synopsis column is ineffective. Otherwise (if the MEASURE is high), the synopsis column is effective.

In result 430, data warehouse module 135 keeps column(s) upon determining the COUNT is high, AVG_SELECTIVITY is low, and MEASURE is high (i.e., the "YES" branch of trigger 425). At least some of the MIN, MAX, or bloom filter columns are determined not to be the same as corresponding to the particular column in the main data table. As the AVG_SELECTIVITY approaches lower values, then the synopsis is effective in skipping blocks of data and in this case, the data warehouse module 135 maintains the columns of synopsis table.

In result 435, data warehouse module 135 drops column(s) upon determining the COUNT is not high, AVG_SELECTIVITY is not low, and MEASURE is not high (i.e., the "NO" branch of trigger 425). At least some of the MIN, MAX, or bloom filter columns are determined not be the same as corresponding to the particular column in the main data table. When a predetermined number of MIN values are the same or a predetermined number of MAX values or a predetermined number of bloom filter values are the same corresponding to the particular column in the main data table, then MIN, MAX, or bloom filter columns are dropped, respectively.

In process 440, data warehouse module 135 iterates through all dropped synopsis columns. The dropped columns are from previous iterations of the synopsis table reorganization upon determining COUNT threshold values are met for recent queries. The entire synopsis table may be dropped if it is found that all the synopsis table columns are ineffective.

In trigger 445, data warehouse module 135 determines if threshold value is met after column(s) are dropped. One or more MIN, MAX, and/or bloom filter columns are dropped at this point and the remaining columns are evaluated to make a determination of the effectiveness of the remaining columns on queries. Once a column is dropped, there is a possibility that a predicate on a column not seen before may not get the benefit of a synopsis in an ad hoc query environment. This is no different than the omission of a traditional index which is infrequently used within a database system.

In process 450, data warehouse module 135 regenerates synopsis table columns upon determining threshold values are met for queries (i.e., the "YES" branch of trigger 445). If current COUNT value for a dropped column is increased to a certain predefined threshold and if the AVG_SELECTIVITY value for a high COUNT indicates that the dropped column may be effective for queries, then data warehouse module 135 triggers a background process to regenerate the dropped MIN or MAX or bloom column depending on the dominant PRED_TYPEs.

Accordingly, by performing the operational steps of FIG. 4, the effectiveness of column types within a synopsis table can be determined by considering: predicates; the effectiveness of MIN, MAX, and bloom columns on queries; count values; avg_selectivity values; and computed MEASURE values.

Figure 5:
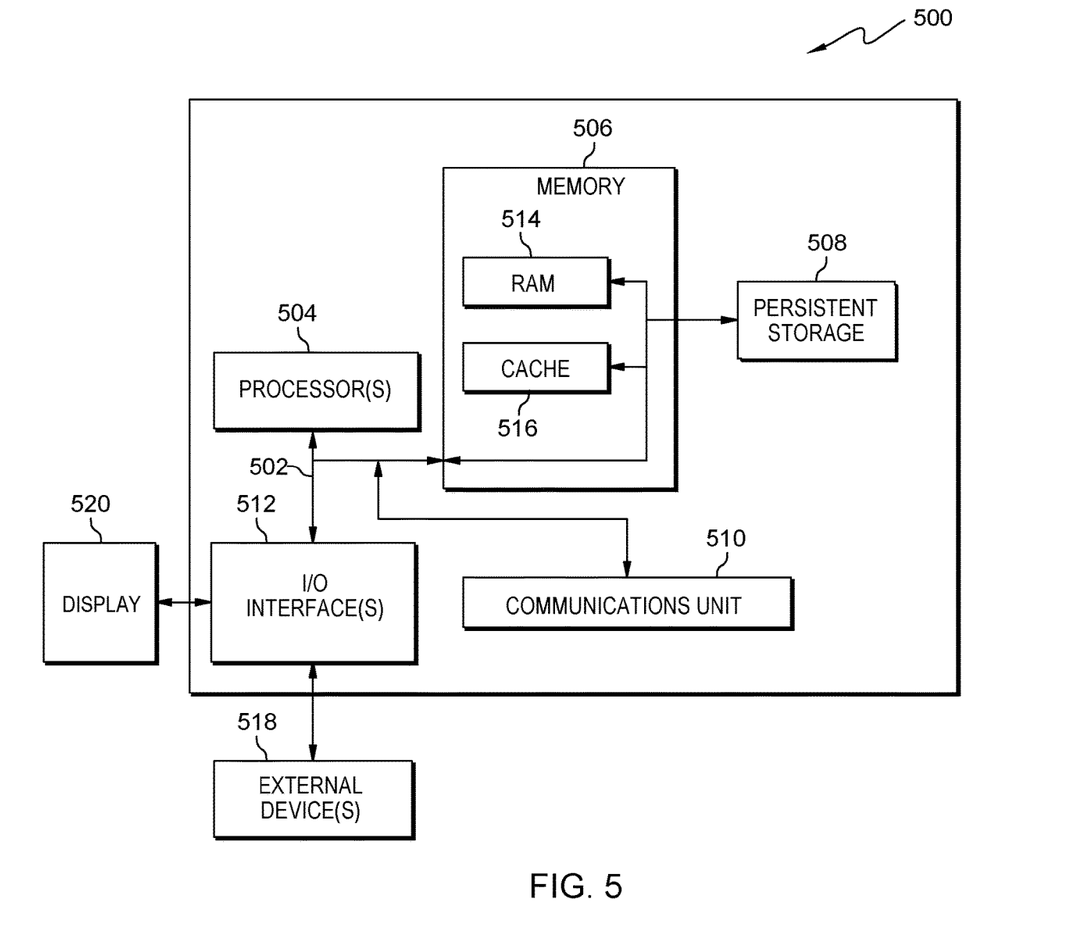
FIG. 5 depicts a block diagram of internal and external components of a computing device, in accordance with an embodiment of the present invention.

FIG. 5 depicts a block diagram of components of a computing device, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for data management, comprising:
 a computer readable storage medium and program instructions stored on the computer readable storage medium, the program instructions comprising:
 program instructions to organize a plurality of columns in one or more data tables, wherein respective columns of the plurality of columns are utilized upon receiving a query that includes a predicate to search a main data table;
 program instructions to monitor a usage of the plurality of columns in the one or more data tables using an in-memory structure, wherein the in-memory structure stores, for each column in the plurality of columns, (i)

a predicate type and (ii) a count of queries that have used the respective column to search the main data table; and program instructions to drop one or more columns of the plurality of columns in the one or more data tables, based on a period of time threshold which defines an effectiveness for optimizing data queries, wherein dropping the one or more columns comprises dropping a subset of a plurality of content associated with at least one type of data structure within the one or more data tables.

2. The computer program product of claim 1, wherein program instructions to monitor the usage of the plurality of columns in the one or more data tables, comprise:

program instructions to compare a number of updates, deletes, and inserts on each region of the main data table, to the number of updates, deletes, and inserts of an associated row of the one or more data tables.

3. The computer program product of claim 1, further comprising:

program instructions to compare data table performance between a first data table of the one or more data tables containing a predicate type, and a corresponding first data table not containing the predicate type;

responsive to determining the first data table at least meets the period of time threshold, program instructions to drop a subset of the plurality of content associated with a first type of data structure, a second type of data structure, and a third type of data structure within the one or more data tables;

program instructions to compare data table performance between a second data table of the one or more data tables with the predicate type to a corresponding second data table with more instances of the predicate type than the second data table; and responsive to determining data table performance of the second data table at least meets the period of time threshold, program instructions to drop the subset of the plurality of content associated with the first type of data structure, the second type of data structure, and the third type of data structure within the one or more data tables.

4. The computer program product of claim 1, further comprising:

program instructions to compare data table performance between a third data table of the one or more data tables containing a first data structure type to a corresponding third data table not containing the first data structure type;

responsive to determining the third data table at least meets the period of time threshold, program instructions to drop the subset of the plurality of content associated with the first data structure type within the one or more data tables;

program instructions to compare data table performance between a fourth data table of the one or more data tables with a first type of data structure, a second type of data structure and a third type of data structure, and a corresponding fourth data table with the first type of data structure and the second type of data structure; and responsive to determining the fourth data table at least meets the selectivity threshold, program instructions to drop the subset of the plurality of content associated with the third type of data structure in the fourth data table within the one or more data tables.

5. The computer program product of claim 1, further comprising:

responsive to determining a predefined threshold is met, program instructions to regenerate one of the dropped subset of the plurality of content associated with at least one type of data structure within the one or more data tables.

6. The computer program product of claim 1, further comprising:

program instructions to compare data table performance between a comprehensive data table of the one or more data tables and a corresponding comprehensive data table; and responsive to determining the comprehensive data table is below the period of time threshold, program instructions to drop the comprehensive data table.

7. A computer system for data management, comprising:
one or more computer processors;
one or more computer readable storage media; and
program instructions stored on the one or more computer readable storage media for execution by at least one of the one or more processors, the program instructions comprising:

program instructions to organize a plurality of columns in one or more data tables, wherein respective columns of the plurality of columns are utilized upon receiving a query that includes a predicate to search a main data table;

program instructions to monitor a usage of the plurality of columns in the one or more data tables using an in-memory structure, wherein the in-memory structure stores, for each column in the plurality of columns, (i) a predicate type and (ii) a count of queries that have used the respective column to search the main data table; and program instructions to drop one or more columns of the plurality of columns in the one or more data tables, based on a period of time threshold which defines an effectiveness for optimizing data queries, wherein dropping the one or more columns comprises dropping a subset of a plurality of content associated with at least one type of data structure within the one or more data tables.

8. The computer system of claim 7, wherein program instructions to monitor the usage of the plurality of columns in the one or more data tables, comprise:

program instructions to compare a number of updates, deletes, and inserts on each region of the main data table, to the number of updates, deletes, and inserts of an associated row of the one or more data tables.

9. The computer system of claim 7, further comprising:
program instructions to compare data table performance between a first data table of the one or more data tables containing a predicate type, and a corresponding first data table not containing the predicate type;

responsive to determining the first data table at least meets the period of time threshold, program instructions to drop a subset of a plurality of content associated with a first type of data structure, a second type of data structure, and a third type of data structure within the one or more data tables;

program instructions to compare data table performance between a second data table of the one or more data tables with the predicate type to a corresponding second data table with more instances of the predicate type than the second data table; and responsive to determining data table performance of the second data table at least meets the period of time threshold, program instructions to drop the subset of the plurality of content associated with the first type of data structure, the second type of data structure, and the third type of data structure within the one or more data tables.

10. The computer system of claim 7, further comprising:
program instructions to compare data table performance between a third data table of the one or more data tables containing a first data structure to a corresponding third data table not containing the first data structure;
responsive to determining the third data table at least meets the period of time threshold, program instructions to drop the subset of the plurality of content associated with the first data structure type within the one or more data tables;
program instructions to compare data table performance between a fourth data table of the one or more data tables with a first type of data structure, a second type of data structure and a third type of data structure, and a corresponding fourth data table with the first type of data structure and the second type of data structure; and responsive to determining the fourth data table at least meets the selectivity threshold, program instructions to drop the subset of the plurality of content associated with the third type of data structure in the fourth data table within the one or more data tables.

11. The computer system of claim 7, further comprising:
responsive to determining a predefined threshold is met, program instructions to regenerate one of the dropped subset of the plurality of content associated with at least one type of data structure within the one or more data tables.

12. The computer system of claim 7, further comprising:
program instructions to compare data table performance between a comprehensive data table of the one or more data tables and a corresponding comprehensive data table; and
responsive to determining the comprehensive data table is below the period of time threshold, program instructions to drop the comprehensive data table.

* * * * *